United States Patent [19]

DeBellis

[11] 3,850,528

[45] Nov. 26, 1974

[54] REFRACTOMETER GAUGE

[76] Inventor: Anthony B. DeBellis, 231 Kriss Rd., Danville, Calif. 94526

[22] Filed: July 25, 1973

[21] Appl. No.: 382,309

[52] U.S. Cl. ............................. 356/133, 356/130
[51] Int. Cl. ................................. G01n 21/22
[58] Field of Search .......... 356/128, 130, 133, 135, 356/136

[56] References Cited
UNITED STATES PATENTS
3,282,149   11/1966   Shaw et al. .................. 356/130

OTHER PUBLICATIONS

Freeman, M.E., "Liquid Level Indicator," IBM Technical Disclosure Bulletin, Vol. 5, No. 1, June 1962.

Primary Examiner—Ronald L. Wibert
Assistant Examiner—Richard A. Rosenberger
Attorney, Agent, or Firm—Bruce and McCoy

[57] ABSTRACT

A refractometer gauge for continuously determining the specific gravity of a fluid through utilization of a means for electrically measuring the index of refraction of the fluid which varies proportionately with its specific gravity.

9 Claims, 3 Drawing Figures

REFRACTOMETER GAUGE

BACKGROUND OF THE INVENTION

1. Field of the Invention

The present invention relates generally to a refractometer gauge and more particularly to a gauge which utilizes a refractometer for continuously measuring the relative change in the index of refraction of a fluid.

It is generally known that the specific gravity of fluids bears a direct and proportional relationship to their index of refraction. Therefore, since in many situations it is desirable to be able to determine the specific gravity of a fluid used in a manufacturing process or the like, various means have been devised for measuring the corresponding index of refraction of the fluid.

Examples of such situations where it is desirable to determine the specific gravity of a fluid occur in the chemical industry, industries utilizing dissolved sugar and similar substances in manufacturing processes, and in situations where the specific gravity of a fluid provides an indication of some other factor to be determined. For instance, it has been found particularly desirable to determine the specific gravity of the fluid used in a lead-acid battery since this measurement provides a direct and precise indication of the state of charge of the battery. Since utilization of the specific gravity method for determination of the state of charge of a battery may have great practical utility in view of the current development of electrically powered vehicles, I will discuss the preferred embodiment of my invention with respect to this use. However, it should be noted that the concept of my invention is not limited to this use and that many corresponding and related uses of my invention will become immediately obvious to those skilled in the art from the following detailed description in conjunction with the accompanying diagrammatic drawings.

2. Description of the Prior Art

Heretofore, there have been numerous well-known methods developed for measuring the specific gravity of fluids. Perhaps the best known and most widely used device for making such measurements is the hydrometer. Hydrometers generally consist of a long, slender glass float, weighted at the lower end, and provided with a scale so graduated that the depth to which the instrument sinks in a fluid indicates its specific gravity by direct reading on the scale. Such instruments give relatively quick and accurate measurements, but are not practical to use in certain situations due to their size and since a continuous electrical read-out is not generally feasible therewith.

In order to overcome the operational problems often times encountered with hydrometers, photoelectric refractometers of the type generally set forth in U.S. Pat. No. 3,282,149 to Shaw et al. have been developed. Such systems generally have a source of light located at one end of a glass rod and a photodetection device, such as a photoresistor, located at the other end of the rod. In operation the glass rod is immersed in a fluid and the intensity of light transmitted through the rod, as measured by the photoresistor, provides some indication of the index of refraction of the fluid when the device is calibrated to a known standard. Since it is known that the index of refraction of a fluid is proportionate to its specific gravity, this method may be utilized to give an accurate and reliable indication of the specific gravity of a fluid.

As is indicated in the Shaw patent, it has heretofore been believed that in order to obtain a linear relation between the output of the photodetection device and the index of refraction of the fluid measured, a bend in the glass rod of at least 360° has been necessary.

However, such large bends in the rod have resulted in a relatively bulky device which is not suitable for use in many situations where size limitations are important, such as with the ordinary automotive-type storage battery. In addition, the large bend of the Shaw rod requires a relatively powerful light source in order to transmit sufficient illumination through the rod for operation of the photodetection device. Such light sources present relatively large power supply demands and have a correspondingly short operational life which results in unreliability in use and increased maintenance expense. Furthermore, since specific gravity and index of refraction vary with the temperature of the fluid, it has not been possible to utilize such photoelectric devices for continuous monitoring of the index of refraction of fluids subjected to operational temperature variations.

Hence, a need exists for a simple, inexpensive and compact photoelectric refractometer that is linear in its operation and temperature compensated. In addition, such a refractometer should present relatively small power supply demands and allow for essentially maintenance-free operation by providing for efficient transmission of illumination through the rod, thereby permitting use of a relatively lowpowered light source with a corresponding greater extended operational life.

SUMMARY OF THE INVENTION

The present invention is a refractometer, for measuring the relative change in the index refraction of a fluid, which generally comprises a rod having an obtuse angular bend formed therein. A source of light, having a wavelength to which the rod is transparent, is positioned adjacent to one end of the rod. A means for maintaining the intensity of the light source at a substantially constant level of luminescence is provided in combination with the light source. Means are disposed adjacent to the other end of the rod for detecting variations of light intensity transmitted through the rod from said light source. In addition, a means is included for maintaining at least a portion of the rod located at the angular bend immersed in and in contact with the fluid in which it is utilized, whereby the relative change in intensity of light detected by the light detecting means is a function of the relative change in refractive index of the fluid.

OBJECTS OF THE INVENTION

It is an important object of the present invention to provide a refractometer gauge which continuously and accurately measures the relative change in the index of refraction of a fluid.

It is another object of the present invention to provide a refractometer gauge which is electrical in its operation and temperature compensated.

It is a further object of the present invention to provide a refractometer gauge which utilizes a sensing means which is submersible in a fluid and which is reliable in use and does not draw significant energy in its operation.

It is yet another object of the present invention to provide a refractometer gauge which can be easily calibrated to provide a large range of readings within the expected maximum deviation of the specific gravity of a fluid to be measured.

It is still a further object of the present invention to provide a refractometer gauge whose output is a substantially linear function of the charge of a lead-acid battery into whose fluid the refractometer is submersed.

And it is yet a further object of the present invention to provide a refractometer gauge which can be utilized as a gassing indicator during the recharging of a lead-acid battery.

Other features and advantages are inherent in the invention claimed and disclosed, or will become apparent to those skilled in the art from the following attached description of the preferred embodiment when taken in conjunction with the accompanying diagrammatic drawings.

DESCRIPTION OF THE PREFERRED EMBODIMENT

Figure 1:
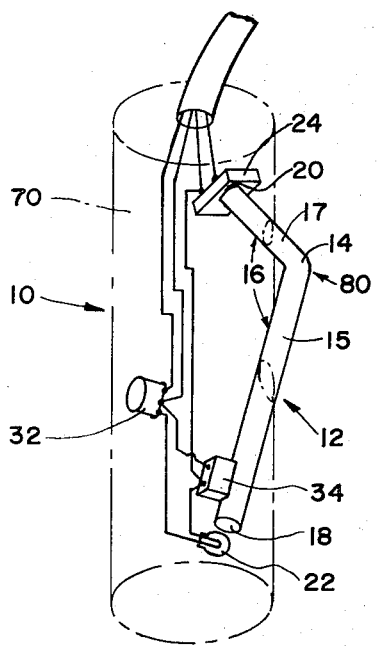
FIG. 1 is a partial perspective assembly view of a battery fuel gauge probe constructed in accordance with a preferred embodiment of the present invention.
Figure 2:
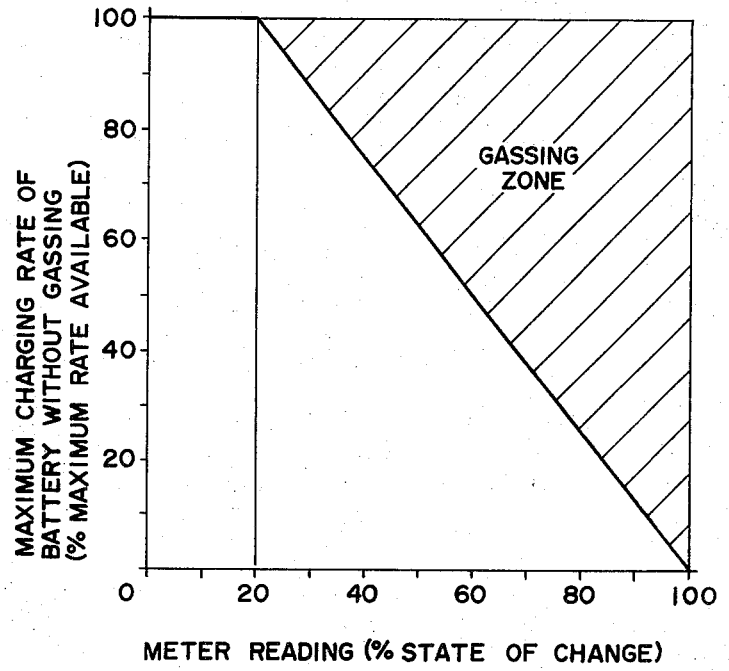
FIG. 2 is an electrical schematic diagram of a preferred embodiment of an electronic circuit of the present invention.

Referring initially to FIGS. 1-2, the preferred embodiment of the present invention is a battery fuel gauge 10 for continuously indicating the state of charge of a lead-acid battery. The gauge is essentially a refractometer 12 which measures the relative change in the index of refraction of the battery fluid, which is a function of its specific gravity, which in turn is the whole controlling factor indicating the state of the charge of the battery. The refractometer utilizes a rod 14, which may be made of glass, plastic or the like having an obtuse angular bend indicated by arrow 16 formed intermediate the ends 18, 20 thereof, which is formed for immersion in the battery fluid. Light is projected through the rod from a light source 22 to a means 24 for detecting variations in the light intensity as transmitted through the rod. The amount of light which reaches the detecting means has been found to be a function of the index of refraction of the battery fluid within which the rod is immersed.

In the present invention the rod has an obtuse angle as indicated by arrow 16 which is preferably more than 90° and less than 180°. This angle is measured between the axis of the two ends 18, 20 of the rod. The optimum angle is approximately 105°. This has been found to permit the widest range of response to changes in the index of refraction with the lowest possible power requirements for the source of lumination due to the light transmission efficiency of the rod bent to this particular angle.

In addition, contrary to the teachings of the prior art, such as the Shaw patent, it has been found with the present invention that a bend or loop in the rod of at least 360° is not necessary in order to obtain a substantially linear relation between the relative output of the refractometer and the refractive index of the battery fluid. With the rod of the present invention formed to the optimum angle of 105°, it has been found that the maximum deviation from the ideal linear response has been less than 5 percent of the average relative output of the refractometer gauge.

However, although the linearity of the present invention and the Shaw looped rod are substantially equivalent, it is believed that the total light transmitting ability of the Shaw looped rod is only about 10 percent of that of the rod of the present invention. Likewise, although the linearity of the prior art U-shaped rod shown in FIG. 4 of the Shaw patent is substantially inferior to that of the rod of the present invention, it is believed that its total light transmitting ability is only about 50 percent of the present invention. As indicated above, this results in correspondingly lower light source and power supply requirements for the refractometer gauge of the present invention.

Referring now back to FIGS. 1-2, a source of light 22 having a wave length to which said rod is transparent is positioned adjacent to one end 18 of the rod. The source of light in the preferred embodiment is a small incandescent light bulb.

Means are provided for maintaining the intensity of the light source at a substantially constant level of luminescence. The preferred embodiment is a transistor 32 connected in series with the incandescent light source 22 for applying current to the bulb. A photoresistor 34 and a resistor 36 combination having the base of the transistor connected to the junction 38 thereof is provided with the combination being connected in parallel with the series connected light bulb and transistor. The photoresistor 34 is luminated by the light bulb 22 and thereby varies the resistance of the photoresistor with variations in intensity of the light bulb. Variations in resistance of the photoresistor 34 in turn vary the base potential of the transistor 32 as a function of the intensity of the light bulb 22, whereby the flow of current from the transistor to the light bulb is controlled in a manner so as to maintain the intensity of the light bulb at a substantially constant level. In this manner it is assured that any variations in light intensity detected by photoresistor 24 are a result of changes in the index of refraction of the fluid being measured, and not changes in intensity of the light source.

Means 40 for detecting variations of light intensity transmitted through the rod 14 are disposed adjacent to the other end 20 of the rod from the light source. The light intensity detecting means comprises a photoresistor 24 positioned adjacent to the end 20 of the rod opposite from said light source 22 and it is connected in series with one side 42 of a variable center-tapped resistor 44. A resistor 50 is connected in series with the other side 46 of the variable resistor and in parallel with the photoresistor 24. a current output meter 60 is connected on one side of the junction of the photoresistor 24 and variable resistor 44 and on the other side at the junction of the resistor 50 with the variable resistor 44.

The resistance of photoresistor 24 is controlled by the illumination provided by light transmitted through the rod, and the current flowing to output meter 60 is accordingly a function of the light intensity transmitted through the rod. Hence, the output meter records the relative changes in intensity of the transmitted light which is a substantially linear function of the relative change in refractive index of the battery fluid.

Means are provided for maintaining the angularly bent portion of the rod immersed in the battery fluid whereby the relative change in the intensity of the light detected by the detecting means is a function of the relative change in the refractive index of the fluid. In the preferred embodiment the detecting means 40 is encapsulated in a plastic 70 along with the light source 22 and means 30 for maintaining the intensity of the light source. In FIG. 1, phantom lines are used to indicate the general shape of the encapsulating plastic about the elements contained in the probe portion of the battery fuel gauge. Wire 55 connects the probe with the output meter 60 and power supply. Likewise, in FIG. 2, phantom lines are used to show those electrical components which are encapsulated in plastic in the probe. Ends 18, 20 of the rod 14 are also encapsulated except for the angularly bent portion 80 of the rod which projects from the plastic so that it will be exposed to the battery fluid when the entire encapsulated assembly is immersed in the battery fluid.

In addition, the whole probe assembly and its related electrical components are thereby maintained at substantially the same temperature as the battery fluid in which it is immersed for effecting temperature compensation. Such temperature compensation results from the fact that photoresistor 24, which is maintained at substantially the same temperature as the fluid in which it is immersed, may be selected so that its output will vary with changes in temperature in a manner complementary to changes in the fluid's index of refraction caused by temperature variations.

Figure 3:
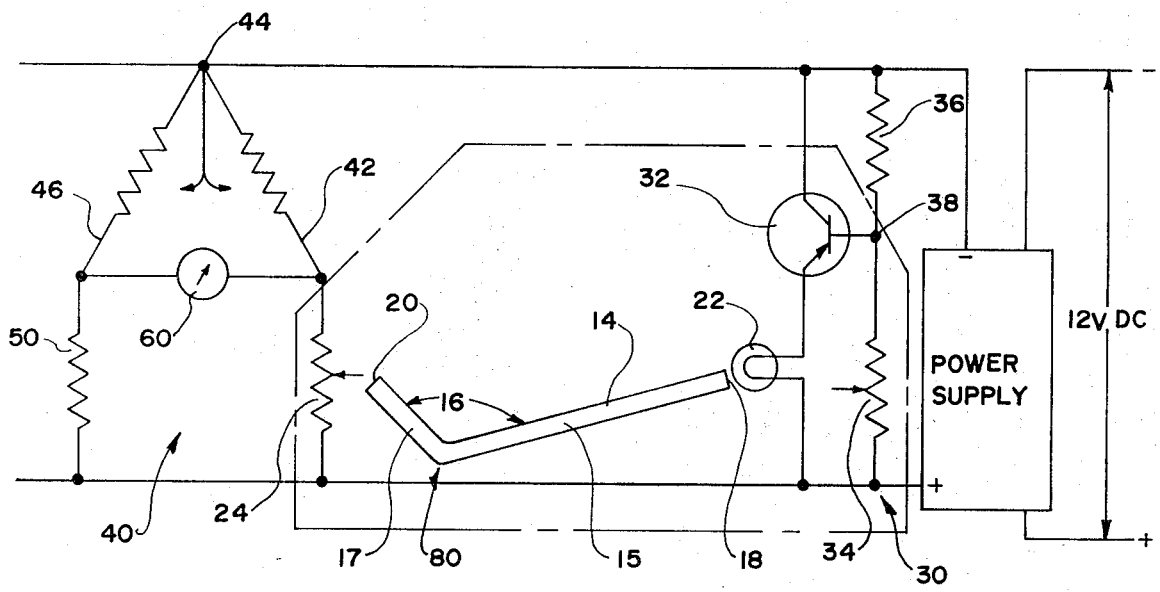
FIG. 3 is a graph showing the maximum current input available for charging a typical automotive-type battery without gassing as a function of the full scale reading of a refractometer gauge constructed in accordance with the present invention.

FIG. 3 illustrates another feature of the preferred embodiment of the invention. When the refractometer gauge is submersed in the fluid of a lead-acid battery with the light source 22 positioned at the bottom of the probe and rod 14, as is generally illustrated by the orientation shown in FIG. 1, the maximum current input charging rate of the battery, expressed as a percentage of the maximum current available from the battery charger, becomes a substantially linear function of the reading indicated on the face of the meter. It has been found that the linearity of this relationship can be brought close to the theoretical ideal by forming rod 14 with one leg 15 of the angular bend substantially longer than the other leg 17 as is shown in FIGS. 1–2.

An additional benefit of forming the rod with one leg longer than the other and orientating the probe and light source in the battery fluid as described above is that any gassing of the battery fluid experienced during charging of the battery will result in very large deviations in the reading of the output meter. This feature is important since gassing, which is caused by electrolysis of the battery fluid, will eventually lead to an internal breakdown of the battery if not controlled.

Heretofore, it has been the general practice to charge a battery at a much lower rate than its theoretical maximum in order to avoid such gassing. However, as a result of this feature of the present invention, a battery may be charged at the maximum rate possible and in the minimum amount of time without the risk of damage due to gassing since the large drop in meter reading may be utilized to instantaneously cut back the rate of charge to an amount appropriate to avoid gassing.

It is believed that the desirable large deviations in the meter reading, typically a drop in meter reading of as much as 25 points on a 100 point scale, which result from gassing of the battery fluid, are caused by the circulation and flow of the gassing bubbles upward along the longer leg 15 of exposed rod portion 80, to the angular bend formed therein. At this point it is believed that a turbulence is created above the angular bend as a result of the shorter leg 17 slanting back to the body of the probe at an angle relatively greater than that of the outward slant of longer leg 15. Hence, a pool of turbulent gas bubbles having an index of refraction significantly less than that of the battery fluid is maintained along and above the angular bend of rod 14, thereby resulting in a large deviation in the output of the refractometer gauge.

In a related manner, it should also be noted that the refractometer gauge will also serve to indicate when the battery fluid drops to a low level. This results from the fact that once the fluid level drops to the exposed rod portion of the gauge, the meter output reading will drop toward a zero reading since the refractive index of air is much less than that of the battery fluid.

While the invention has been described in detail, it is not to be limited to such terms as have been set forth except as may be necessitated by the claims.

What is claimed is:

1. A refractometer for measuring the relative change in the index of refraction of a fluid comprising:
   a rod having an obtuse angular bend formed intermediate the ends thereof;
   a source of light, having a wave length to which said rod is transparent, positioned adjacent to one end of said rod;
   means disposed adjacent to the other end of said rod from said light source for detecting variations of light intensity transmitted through said rod; and
   means for maintaining the angularly bent portion of said rod immersed in said fluid, whereby the relative change in intensity of light detected by said detecting means is a function of the relative change in refractive index of said fluid.

2. The refractometer of claim 1 wherein said obtuse angular bends is approximately 105°.

3. The refractometer of claims 1 wherein the leg of said rod between said source of light and said obtuse angular bend is longer than the other leg of said rod between said light intensity detecting means and said obtuse angular bend.

4. The refractometer of claim 1 further including
   means for temperature compensation of said detecting means for changes in temperature of said fluid whereby the absolute range of relative change in intensity of light detected by said detecting means remains substantially constant for all operating temperatures of said fluid.

5. The refractometer of claim 3 wherein the temperature compensating means comprises
   said detecting means comprising a temperature dependent photoresistor and encapsulated in plastic along with said light source and said rod, except for the angularly bent portion which projects from said plastic and is exposed to said fluid when the encapsulated assembly is immersed in said fluid, whereby the encapsulated assembly is maintained at substantially the same temperature as said fluid.

6. The refractomer of claim 1 further including a means for maintaining the intensity of said light source at a substantially constant level of luminesence.

7. The refractometer of claim 6 wherein the light source constant intensity maintaining means comprises:
- an incandescent electric light bulb having a transistor connected in series therewith for providing current thereto,
- a photoresistor and a resistor combination having the base of said transistor connected to the junction thereof and said combination being connected in parallel with said series connected light bulb and transistor, said photoresistor being illuminated by said light bulb and varying the resistance of said photoresistor, and thereby varying the base potential of said transistor as a function of the intensity of said light bulb whereby the flow of current from said transistor to said light bulb is controlled in a manner so as to maintain the intensity of said light bulb at a substantially constant level.

8. The refractometer of claim 1 wherein the light intensity detecting means comprises:
- a photoresistor positioned adjacent to the end of said rod opposite said light source and connected in series with one side of a variable center tapped resistor,
- a resistor connected in series with the other side of said variable resistor and in parallel with said photoresistor,
- a current output meter connected on one side at the junction of said photoresistor with the variable resistor and on the other side at the junction of said resistor with the variable resistor, said photoresistor being illuminated by light transmitted through said rod and varying the resistance of said photoresistor, and thereby varying the current flowing to said output meter as a function of the variation in light intensity transmitted through said rod, whereby said output meter records the relative change in intensity of said transmitted light which is a function of the relative change in refractive index of said fluid.

9. A refractometer for measuring the relative change in the index of refraction of a fluid comprising:
- a rod having an obtuse angular bend of approximately 105° formed intermediate the ends thereof:
- one leg of said rod between the obtuse angular bend and one of said ends thereof being longer than the other leg of said rod between the obtuse angular bend and the other of said ends thereof;
- an incandescent electric light bulb, having a wave length to which said rod is transparent, positioned adjacent to the end of the longer leg of said rod;
- means for maintaining the intensity of said light bulb at a substantially constant level of luminesence;
- means disposed adjacent to the other end of said rod opposite said light bulb for detecting variations of light intensity transmitted through said rod, said means including a photoresistor positioned adjacent to said end of the rod and connected in series with one side of a variable center tapped resistor, and a resistor connected in series with the other side of said variable resistor and in parallel with said photoresistor, and a current output meter connected on one side at the junction of said photoresistor with the variable resistor and on the other side at the junction of said resistor with the variable resistor, said photoresistor being illuminated by light transmitted through said rod and varying the resistance of said photoresistor, and thereby varying the current flowing to said output meter as a function of the variation in light intensity transmitted through said rod;
- means for temperature compensation of said detecting means including said photoresistor being temperature dependent and being encapsulated in plastic along with said light bulb and the ends of said rod, whereby the encapsulated assembly is maintained at substantially the same temperature as said fluid in which it is immersed and the absolute range of relative change in intensity of light detected by said photoresistor remains substantially constant for all operating temperatures of said fluid;
- means for maintaining the angularly bent portion of said rod immersed in and exposed to said fluid, whereby the relative change in intensity of light detected by said detecting means is a function of the relative change in refractive index of said fluid.

* * * * *